(12) United States Patent
Kita (10) Patent No.: US 11,341,423 B2
(45) Date of Patent: May 24, 2022

(54) INFORMATION PROCESSING APPARATUS, ARTIFICIAL INTELLIGENCE SELECTION METHOD, AND ARTIFICIAL INTELLIGENCE SELECTION PROGRAM

(71) Applicant: CASIO COMPUTER CO., LTD., Tokyo (JP)

(72) Inventor: Kazunori Kita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 719 days.

(21) Appl. No.: 16/135,204

(22) Filed: Sep. 19, 2018

(65) Prior Publication Data
US 2019/0087736 A1   Mar. 21, 2019

(30) Foreign Application Priority Data

Sep. 19, 2017 (JP) .............................. JP2017-179487

(51) Int. Cl.
| | |
|---|---|
| *G06N 5/04* | (2006.01) |
| *G06F 3/01* | (2006.01) |
| *G06N 20/00* | (2019.01) |
| *G06K 9/62* | (2022.01) |
| *G06N 3/00* | (2006.01) |
| *G06V 20/10* | (2022.01) |
| *G06V 40/10* | (2022.01) |

(52) U.S. Cl.
CPC ............ *G06N 5/043* (2013.01); *G06F 3/011* (2013.01); *G06K 9/6227* (2013.01); *G06N 3/006* (2013.01); *G06N 20/00* (2019.01); *G06V 20/10* (2022.01); *G06V 40/10* (2022.01)

(58) Field of Classification Search
CPC combination set(s) only.
See application file for complete search history.

(56) References Cited

U.S. PATENT DOCUMENTS

| | | | | |
|---|---|---|---|---|
| 4,850,005 A | * | 7/1989 | Hashimoto | ........... H04M 1/645 379/51 |
| 5,548,699 A | * | 8/1996 | Ishida | .................. G06F 16/338 345/440 |
| 5,628,011 A | * | 5/1997 | Ahamed | ................ G06N 5/043 |
| 6,047,279 A | * | 4/2000 | Barrack | ............. H04L 41/0206 706/60 |

(Continued)

FOREIGN PATENT DOCUMENTS

| | | |
|---|---|---|
| JP | 6128472 B1 | 5/2017 |
| WO | 2017/145466 A1 | 8/2017 |
| WO | WO-2018227462 A1 * 12/2018 | ......... G06F 16/3329 |

OTHER PUBLICATIONS

Notification of Reasons for Refusal dated Dec. 3, 2019 in Japanese Patent Application No. 2017-179487.

*Primary Examiner* — Motilewa Good-Johnson
(74) *Attorney, Agent, or Firm* — Scully Scott Murphy & Presser (57) ABSTRACT

To more suitably select an artificial intelligence. An information processing apparatus according to one embodiment of the present invention, includes a user information acquisition unit and an AI selection unit. The user information acquisition unit acquires information relevant to a scene as user-related information. The AI selection unit selects an artificial intelligence from a plurality of artificial intelligences, on the basis of the user-related information.

18 Claims, 4 Drawing Sheets

AI EVALUATION POINT TABLE (FOR FIRST USER)

| AI NAME | FIRST USE SCENE (SEARCH DURING WORKING TIME) | SECOND USE SCENE (PRIVATE SEARCH) | THIRD USE SCENE (ADVICE) | FOURTH USE SCENE (DOCUMENT PREPARATION) | ... |
|---|---|---|---|---|---|
| AGENT A1 | 1.0 | 5.6 | 2.0 | — | ... |
| AGENT B1 | 6.8 | 1.6 | 1.0 | — | ... |
| AGENT C1 | -1.5 | 0.5 | 7.0 | — | ... |
| AGENT D1 | — | — | -0.5 | 6.8 | ... |
| ⋮ | ⋮ | ⋮ | ⋮ | ⋮ | ⋱ |

⋮

AI EVALUATION POINT TABLE (FOR N-TH USER)

| AI NAME | FIRST USE SCENE (SEARCH DURING WORKING TIME) | SECOND USE SCENE (PRIVATE SEARCH) | THIRD USE SCENE (ADVICE) | FOURTH USE SCENE (DOCUMENT PREPARATION) | ... |
|---|---|---|---|---|---|
| ⋮ | ⋮ | ⋮ | ⋮ | ⋮ | ⋱ |

(56) References Cited

U.S. PATENT DOCUMENTS

| | | | |
|---|---|---|---|
| 2001/0049084 A1* | 12/2001 | Mitry | G09B 19/00 434/118 |
| 2005/0143138 A1* | 6/2005 | Lee | G06F 3/011 455/566 |
| 2018/0150749 A1* | 5/2018 | Wu | G06F 16/9535 |
| 2018/0204382 A1* | 7/2018 | Simpson | G09B 5/067 |
| 2018/0218252 A1* | 8/2018 | Wu | G06N 3/006 |
| 2018/0268302 A1* | 9/2018 | Tosh | G06F 9/5066 |
| 2018/0314942 A1* | 11/2018 | Shinn | G06N 3/08 |
| 2018/0329399 A1* | 11/2018 | Neelakandan | G06Q 10/06315 |
| 2019/0042574 A1* | 2/2019 | Kim | G06K 9/6254 |
| 2019/0122093 A1* | 4/2019 | Yonekura | G06Q 50/01 |

\* cited by examiner

FIG. 3

AI EVALUATION POINT TABLE (FOR FIRST USER)

| AI NAME | FIRST USE SCENE (SEARCH DURING WORKING TIME) | SECOND USE SCENE (PRIVATE SEARCH) | THIRD USE SCENE (ADVICE) | FOURTH USE SCENE (DOCUMENT PREPARATION) | ... |
|---|---|---|---|---|---|
| AGENT A1 | 1.0 | 5.6 | 2.0 | — | ... |
| AGENT B1 | 6.8 | 1.6 | 1.0 | — | ... |
| AGENT C1 | −1.5 | 0.5 | 7.0 | — | ... |
| AGENT D1 | — | — | −0.5 | 6.8 | ... |
| ... | ... | ... | ... | ... | ... |

...

AI EVALUATION POINT TABLE (FOR N-TH USER)

| AI NAME | FIRST USE SCENE (SEARCH DURING WORKING TIME) | SECOND USE SCENE (PRIVATE SEARCH) | THIRD USE SCENE (ADVICE) | FOURTH USE SCENE (DOCUMENT PREPARATION) | ... |
|---|---|---|---|---|---|
| ... | ... | ... | ... | ... | ... |

INFORMATION PROCESSING APPARATUS, ARTIFICIAL INTELLIGENCE SELECTION METHOD, AND ARTIFICIAL INTELLIGENCE SELECTION PROGRAM

CROSS-REFERENCE TO RELATED APPLICATIONS

This application is based upon and claims the benefit of priority under 35 USC 119 of Japanese Patent Application No. 2017-179487 filed on Sep. 19, 2017 the entire disclosure of which, including the description, claims, drawings, and abstract, is incorporated herein by reference in its entirety.

BACKGROUND OF THE INVENTION

1. Field of the Invention

The present invention relates to an information processing apparatus, an artificial intelligence selection method, and an artificial intelligence selection program.

2. Description of the Related Art

Conventionally, a technology of supporting a user according to an artificial intelligence is known. For example, an assistant function or the like is used in which the artificial intelligence searches information with respect to a question of the user, and suggests an answer considered as being requested by the user. The user is capable of using functions of an artificial intelligence which is mounted on a terminal device, or an artificial intelligence which is provided by a server. Here, recently, a plurality of types of artificial intelligences have been practically realized, and it has been required to select one from the plurality of artificial intelligences for the purpose. For example, in JP 6128472 B2, a technology is disclosed in which a predetermined artificial intelligence is selected from the plurality of artificial intelligences, on the basis of input data input by a terminal user.

BRIEF SUMMARY OF THE INVENTION

One aspect of the embodiment is an information processing apparatus comprising: a processor; and a memory, wherein the processor executes a program stored in the memory to perform operations comprising: acquiring information relevant to a scene as user-related information; and selecting one artificial intelligence from a plurality of artificial intelligences, on the basis of the user-related information.

DETAILED DESCRIPTION OF THE INVENTION

Embodiments of the present invention will be explained with reference to the drawings.

Hereinafter, an embodiment of the present invention will be described by using the drawings.

An information processing apparatus according to the present invention, selects an optimal artificial intelligence for a user, from a plurality of artificial intelligences, when the user uses an artificial intelligence (AI). At this time, the information processing apparatus specifies a use scene (a scene) of the user using the artificial intelligence, on the basis of information relevant to the use scene, as user-related information. In addition, the information processing apparatus selects an optimal artificial intelligence for the specified use scene. Further, the information processing apparatus suggests the selected artificial intelligence to the user. Therefore, the information processing apparatus according to the present invention is capable of suggesting an optimal artificial intelligence according to the use scene to the user even before a question or the like is received from the user.

[Hardware Configuration]

Figure 1:
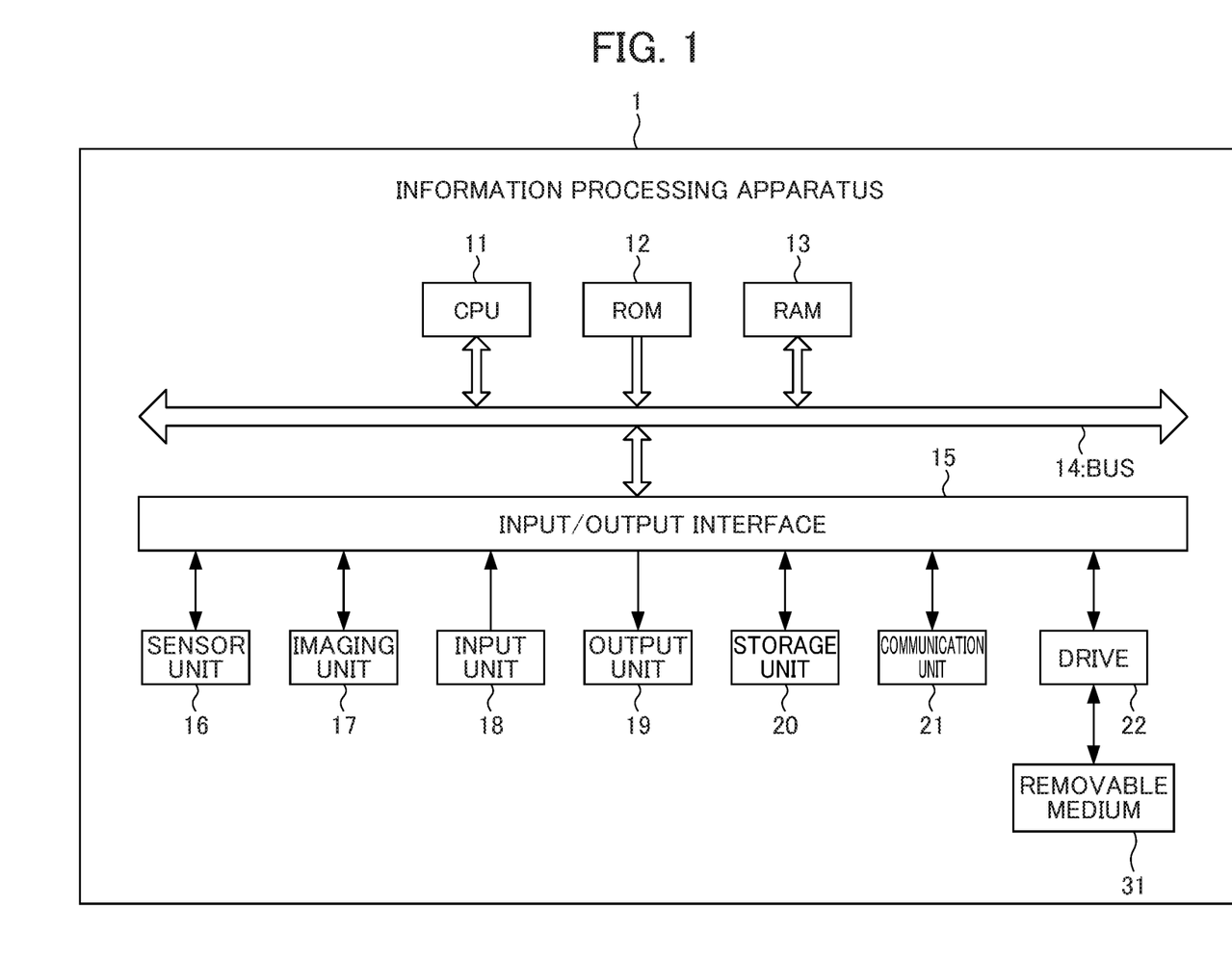
FIG. 1 is a block diagram illustrating a hardware configuration of an information processing apparatus according to one embodiment of the present invention.

FIG. 1 is a block diagram illustrating a hardware configuration of an information processing apparatus 1 according to one embodiment of the present invention. The information processing apparatus 1, for example, is configured as a smart phone.

As illustrated in FIG. 1, the information processing apparatus 1 includes a central processing unit (CPU) 11, a read only memory (ROM) 12, a random access memory (RAM) 13, a bus 14, an input/output interface 15, a sensor unit 16, an imaging unit 17, an input unit 18, an output unit 19, a storage unit 20, a communication unit 21, and a drive 22.

The CPU 11 executes various processings according to a program recorded in the ROM 12, or a program loaded in the RAM 13 from the storage unit 20.

Data or the like necessary for the CPU 11 to execute various processings, is also suitably stored in the RAM 13.

The CPU 11, the ROM 12, and the RAM 13 are connected to each other through the bus 14. In addition, the input/output interface 15 is also connected to the bus 14. The sensor unit 16, the imaging unit 17, the input unit 18, the output unit 19, the storage unit 20, the communication unit 21, and the drive 22 are connected to the input/output interface 15.

The sensor unit 16 includes at least a motion sensor for measuring a physical amount which is changed according to the motion of the user. The motion sensor, for example, includes a triaxial acceleration sensor measuring an acceleration in a triaxial direction, a triaxial angular velocity sensor measuring an angular velocity in the triaxial direction, and a triaxial geomagnetic sensor measuring geomagnetism in the triaxial direction. The sensor unit 16 measures the acceleration, the angular velocity, and the geomagnetic in the triaxial direction by the triaxial acceleration sensor, the triaxial angular velocity sensor, and the triaxial geomagnetic sensor, for each sampling period (for example, 0.001 seconds) set in advance. Data of the acceleration, the angular velocity, and the geomagnetic measured by the sensor unit 16, is associated with data of a measurement time, and is stored in the storage unit 20 or is output to the CPU 11. Furthermore, the sensor unit 16, for example, may include a sensor for measuring an environmental condition, such as a barometric pressure sensor, an ultraviolet sensor, a temperature sensor, and a humidity sensor. Further, the sensor unit 16 may include a sensor for positioning a position, such as a global positioning system (GPS).

Even though it is not illustrated, the imaging unit 17 includes an optical lens unit and an image sensor. The optical lens unit is configured of a lens focusing light, such as a focus lens or a zoom lens, in order to capture a subject. The focus lens is a lens forming a subject image on a light receiving surface of the image sensor. The zoom lens is a lens freely changing a focal distance within a certain range. In addition, as necessary, a peripheral circuit adjusting a setting parameter such as a focal point, exposure, and a white balance, is disposed in the imaging unit 17.

The image sensor is configured of a photoelectric conversion element, an analog front end (AFE), or the like. The photoelectric conversion element, for example, is configured of a complementary metal oxide semiconductor (CMOS) type photoelectric conversion element or the like. The subject image is incident on the photoelectric conversion element from the optical lens unit. Then, the photoelectric conversion element performs photoelectric conversion (imaging) with respect to the subject image, accumulates an image signal for a constant time, and sequentially supplies the accumulated image signals to the AFE, as an analog signal. The AFE executes various signal processings such as analog/digital (A/D) conversion processing, with respect to the analog image signal. A digital signal is generated by the various signal processings, and is suitably supplied to the CPU 11, an image processing unit (not illustrated), or the like, as an output signal of the imaging unit 17.

The input unit 18 is configured of various buttons, a touch panel, a microphone, or the like, and inputs various information items according to an instruction and an operation of the user. The output unit 19 is configured of a display, a speaker, or the like, and outputs an image or a sound. The storage unit 20 is configured of a semiconductor memory such as a dynamic random access memory (DRAM), and stores various data items. The communication unit 21 controls communication with respect to the other device (not illustrated) through a network including the Internet.

A removable medium 31 configured of a magnetic disk, an optical disk, a magnetooptical disk, a semiconductor memory, or the like, is suitably mounted on the drive 22. A program which is read out from the removable medium 31 by the drive 22, as necessary, is installed in the storage unit 20. In addition, the removable medium 31 is capable of storing various data items such as data of an image stored in the storage unit 20, as with the storage unit 20.

[Functional Configuration]

Figure 2:
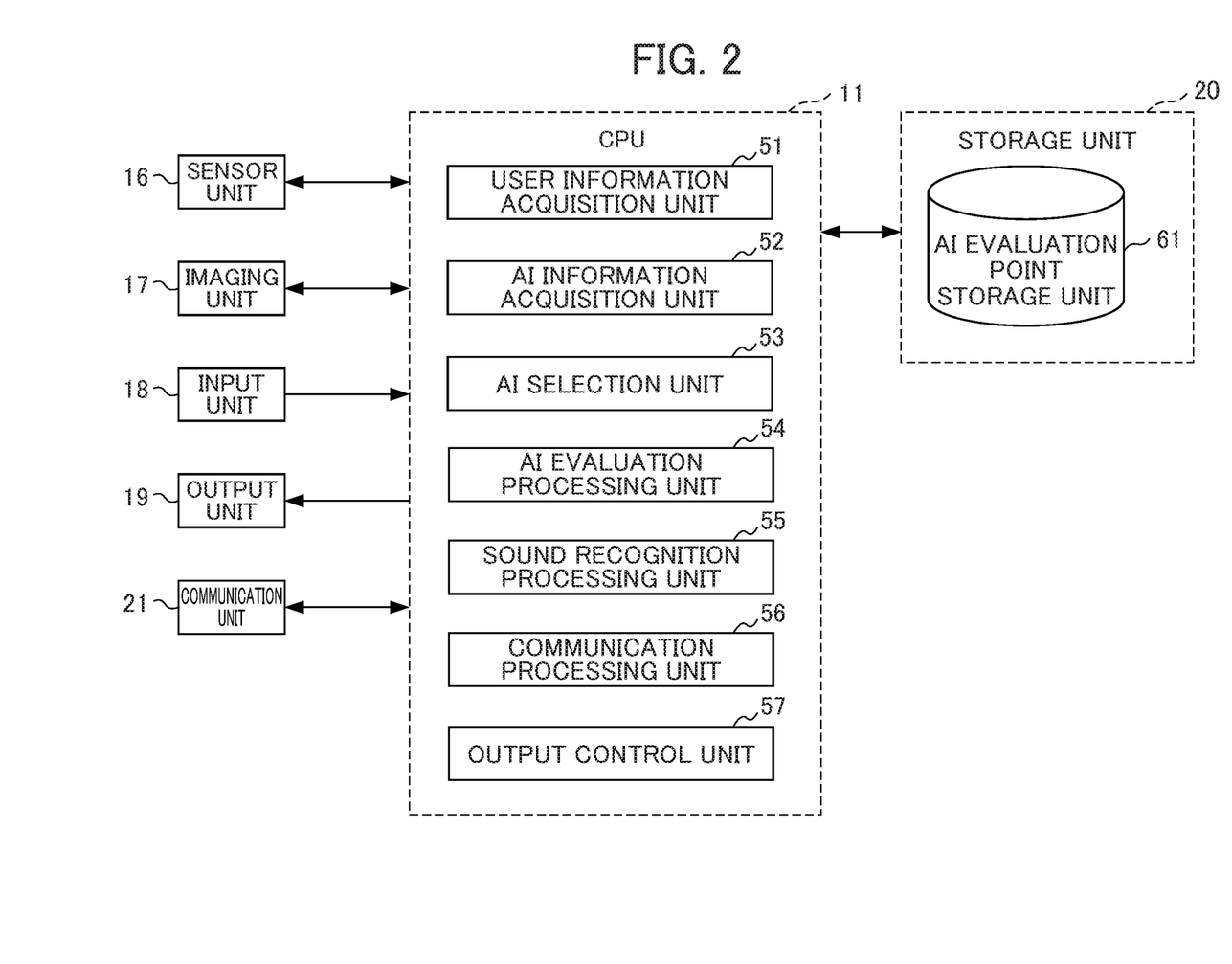
FIG. 2 is a functional block diagram illustrating a functional configuration for executing AI selection processing, in functional configurations of the information processing apparatus of FIG. 1.

FIG. 2 is a functional block diagram illustrating a functional configuration for executing AI selection processing, in functional configurations of the information processing apparatus 1 of FIG. 1. The AI selection processing is a set of processings in which when the user uses an artificial intelligence, the artificial intelligence to be used by the user (for example, an artificial intelligence agent) is selected, and the selected artificial intelligence is suggested to the user. In this embodiment, for example, the artificial intelligence agent (also referred to as an artificial intelligence assistant) which communicates with the user, responds according to a request of the user, provides a service, or operates various electronic devices, is suggested, as the artificial intelligence to be suggested to the user.

In a case where the AI selection processing is executed, as illustrated in FIG. 2, in the CPU 11, a user information acquisition unit 51, an AI information acquisition unit 52, an AI selection unit 53, an AI evaluation processing unit 54, a sound recognition processing unit 55, a communication processing unit 56, and an output control unit 57 function. In addition, an AI evaluation point storage unit 61 is set in one region of the storage unit 20.

The user information acquisition unit 51 acquires user information. Then, the user information acquisition unit 51 specifies the use scene of the artificial intelligence of the user, on the basis of the acquired user information. The user information, for example, includes user identification information for identifying the user, and the user-related information. The user identification information, for example, is the name of the user, or an ID assigned to the user.

The user-related information includes information relevant to the use scene, for specifying the use scene of the artificial intelligence of the user. The information relevant to the use scene, for example, is information indicating the characteristics of the user, the situation, the environment, or the like where the user exists.

The information indicating the characteristics of the user, for example, is the age or the gender of the user, fitness information, behavior information, biological information, and the like. The user information acquisition unit 51 is capable of acquiring the age or the gender of the user from the user in advance, according to an operation using the input unit 18. In addition, the user information acquisition unit 51 similarly acquires the fitness information, the behavior information, and the biological information from the user according to the operation using the input unit 18, or acquires the information according to the measurement of each of the sensors included in the sensor unit 16. For example, the user information acquisition unit 51 acquires a measurement value of the acceleration or the angular velocity of the triaxial acceleration sensor or the triaxial angular velocity sensor, and thus, is capable of performing behavior analysis of analyzing which fitness or behavior the user performs. In addition, for example, the user information acquisition unit 51 acquires the measurement value of the biological sensor, and thus, it is possible to known the biological information of the user.

In addition, the information indicating the situation, the environment, or the like where the user exists, for example, is the current time zone, the location of the user, information of an application that the user currently uses, and the like. For example, the user information acquisition unit 51 is capable of acquiring the current time zone from a clock function (not illustrated) of the information processing apparatus 1. In addition, for example, the user information acquisition unit 51 acquires positioning information such as the GPS, from the sensor unit 16, and thus, it is possible to know the current location of the user, and a movement path of the user.

In addition, for example, the user information acquisition unit 51 is capable of acquiring the information of the application that the user currently uses, from an application execution function (not illustrated) of the information processing apparatus 1. In addition, for example, the user information acquisition unit 51 communicates with a device that the user currently uses, through the communication unit 21, and thus, the information of the application that the user currently uses, can also be acquired.

The user information acquisition unit 51 specifies the use scene of the artificial intelligence of the user, on the basis of each of the information items acquired as described above. For example, the user information acquisition unit 51 specifies that it is a use scene where running is performed, or it is a use scene where cooking is performed, on the basis of the result of the behavior analysis.

In addition, for example, the user information acquisition unit 51 specifies that it is a use scene where an internet search is performed, on the basis of the information of the application that the user currently uses. In addition, in this case, the user information acquisition unit 51 further specifies that it is a use scene where the internet search is performed during working time, or it is a use scene where the internet search is performed at home, on the basis of the position information or the time zone. The user information acquisition unit 51 notifies the AI selection unit 53 of the specified use scene.

The AI information acquisition unit 52 is a portion which acquires artificial intelligence information with respect to each of the plurality of artificial intelligences. The artificial intelligence information, for example, includes identification information of the artificial intelligence, or information relevant to the characteristics of the artificial intelligence.

The identification information of the artificial intelligence, for example, is a product name or a service name of the artificial intelligence, or an ID assigned to the artificial intelligence.

The information relevant to the characteristics of the artificial intelligence, for example, is information indicating a function or a use application of the artificial intelligence. For example, the information relevant to the characteristics of the artificial intelligence is information indicating the presence or absence of an internet search function, the presence or absence of a function of giving the user advice, the type of device which is a control target of the artificial intelligence, or the like. In addition, the information relevant to the characteristics of the artificial intelligence may be information indicating more detailed functions. For example, the information relevant to the characteristics of the artificial intelligence may be information not only information indicating that the internet search function is present, but also information indicating that it is specialized in a search relevant to a legal term, or information indicating that it is specialized in a search for a cooking recipe.

For example, the AI information acquisition unit 52 stores the information relevant to the characteristics of the artificial intelligence in one region of the storage unit 20, as a database, and thus, is capable of acquiring the information relevant to the characteristics of the artificial intelligence. In addition, for example, the AI information acquisition unit 52 performs communication with respect to a server providing the artificial intelligence, or the like, through the communication unit 21, and thus, is capable of acquiring the information relevant to the characteristics of the artificial intelligence. The AI information acquisition unit 52 notifies the AI selection unit 53 of the artificial intelligence information with respect to each of the plurality of artificial intelligences.

The AI selection unit 53 selects an artificial intelligence corresponding to the use scene, on the basis of the use scene specified by the user information acquisition unit 51, and the artificial intelligence information with respect to each of the plurality of artificial intelligences. For example, in a case where the use scene is running, the AI selection unit 53 selects an artificial intelligence having a function of giving advice with respect to running, as the artificial intelligence corresponding to the use scene. In addition, for example, in a case where the use scene is cooking, the AI selection unit 53 selects an artificial intelligence which is specialized in a search for a cooking recipe, as the artificial intelligence corresponding to the use scene.

The AI selection unit 53 may perform such selection every time according to calculation of checking whether or not the use scene and artificial intelligence information with respect to each of the plurality of artificial intelligences are coincident with each other. In addition, the AI selection unit 53 may prepare a corresponding list of the use scene and each of the plurality of artificial intelligences, in advance, and may perform the selection by referring to the list.

Then, the AI selection unit 53 notifies the sound recognition processing unit 55, the communication processing unit 56, and the output control unit 57 of the selected artificial intelligence as an artificial intelligence performing communication with respect to the user. Furthermore, in a case where there is no artificial intelligence corresponding to the use scene, it is not possible to select the artificial intelligence. Therefore, for example, one versatile artificial intelligence which is not specialized in any function, but has any function, may be prepared.

In addition, there may be a plurality of artificial intelligences corresponding to the use scene. For example, there may be a plurality of artificial intelligences having the function of giving the user the advice. In this case, the AI selection unit 53 performs search refinement of the artificial intelligence, on the basis of an evaluation point with respect to each of the artificial intelligences, which is stored in the AI evaluation point table stored in the AI evaluation point storage unit 61.

Specifically, the AI selection unit 53 selects one artificial intelligence having the highest evaluation point. Thus, it is possible to select an optimal artificial intelligence for each user according to the evaluation point based on sense or sensibility of each of the users, without selecting the artificial intelligence by each of the users according to a unified standard. For example, in a case where there are a plurality of artificial intelligences performing some sort of advice with respect to the user, in each of the artificial intelligences, there is personality such as how to select words and how to say words, and thus, a preferred artificial intelligence is different according to the user. In this embodiment, even in such a case, it is possible to select the optimal artificial intelligence for each of the users, according to the evaluation point based on the sense or the sensibility of each of the users.

The AI evaluation processing unit 54 applies the evaluation point to each of the plurality of artificial intelligences. The evaluation point is applied on the basis of the evaluation of the user using the artificial intelligence. For example, in a certain use scene, the user asks the same question with respect to the plurality of artificial intelligences, compares a plurality of answers which are answered by each of the artificial intelligences, and selects any answer. The AI evaluation processing unit 54 applies the evaluation point to the artificial intelligence giving the selected answer.

In addition, for example, the AI evaluation processing unit 54 receives the evaluation point from the user using the artificial intelligence, through the input unit 18, and applies the received evaluation point to the artificial intelligence. The evaluation point, for example, may be received as the value itself of the evaluation point. In addition, more simply, for example, a method may be used in which a predetermined evaluation point increases or decreases according to an operation of a button such as a good or bad button from the user. In addition, for example, a method may be used in which in a case where the user changes the artificial intelligence according to a manual operation, an evaluation value of an artificial intelligence which is a change source, is deducted, and an evaluation value of an artificial intelligence which is a change destination, is added. Further, for example, a method may be used, in which the face of the user is imaged by the imaging unit 17, and thus, the feeling of the user is estimated, and a predetermined evaluation point increases or decreases according to the estimated feeling. In addition, for example, the AI evaluation processing unit 54 may use an evaluation program or evaluation calculation such as an evaluation artificial intelligence evaluating an answer of an artificial intelligence, and thus, may automatically evaluate the answer of the selected artificial intelligence, and may apply the evaluation point.

In addition, for example, the AI evaluation processing unit 54 may transmit the answer of the artificial intelligence to a third-party organization, and the third-party organization may evaluate the answer of the selected artificial intelligence.

The AI evaluation processing unit 54 rewrites the evaluation point with respect to each of the artificial intelligences, which is stored in the AI evaluation point table stored in the AI evaluation point storage unit 61, according to the evaluation point to be applied.

Figure 3:
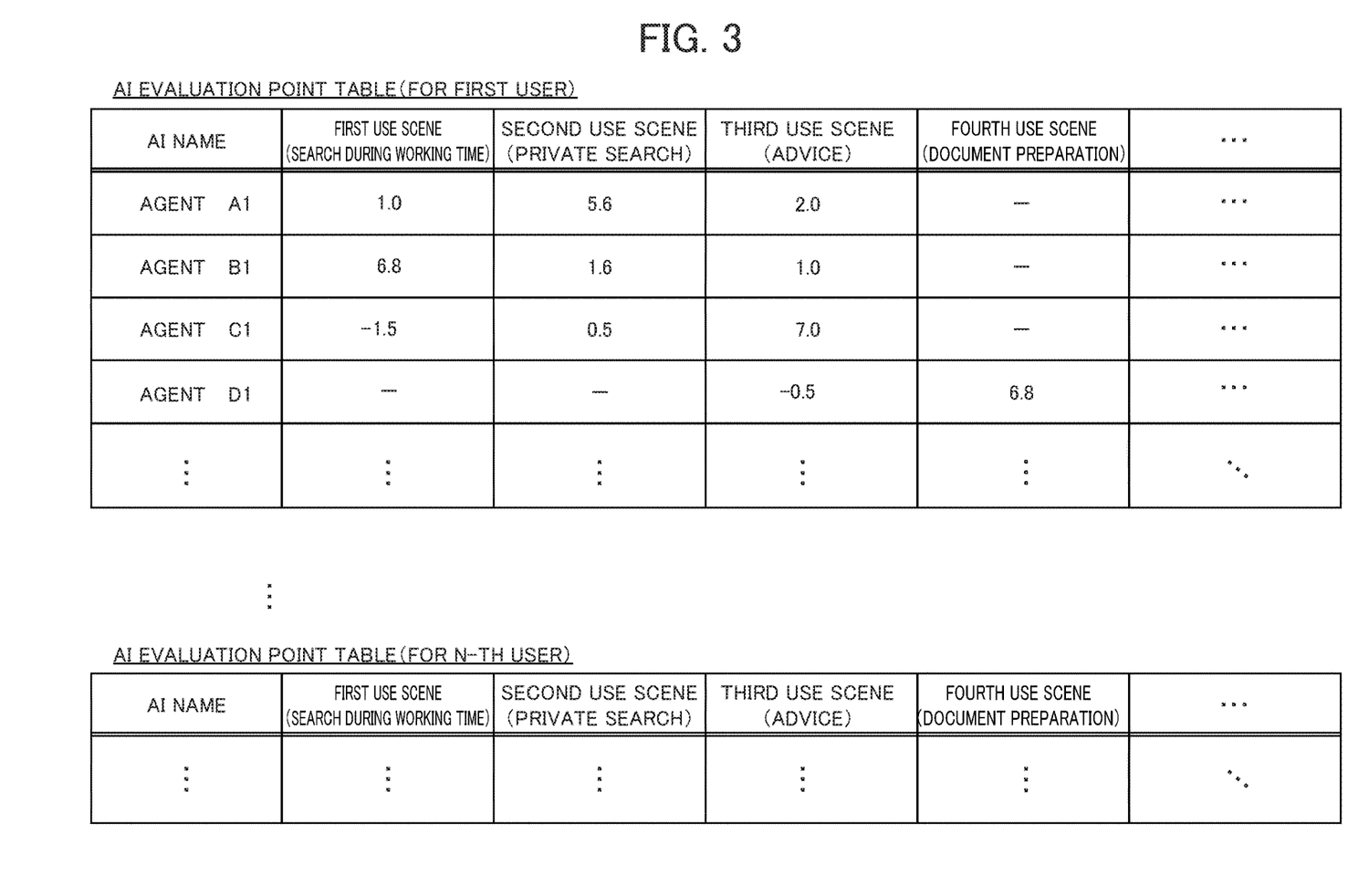
FIG. 3 is a schematic diagram illustrating an example of an AI evaluation point table.

The AI evaluation point table stored in the AI evaluation point storage unit 61, will be described with reference to FIG. 3. The AI evaluation point table is prepared with respect to each of the users. For example, as illustrated in the drawing, the AI evaluation point table is prepared with respect to each of the users from the first user to the N-th user (N is an arbitrary natural number).

In the AI evaluation point table, the identification information of each of the artificial intelligences, and the evaluation point with respect to each of the artificial intelligences in each of the use scenes, are stored. In an example of FIG. 3, the name of the artificial intelligence is stored as the identification information of each of the artificial intelligences. In addition, for example, in an "agent A1", an evaluation point with respect to a "first use scene (a search during working time)" is stored to be "1.0", an evaluation point with respect to a "second use scene (a private search)" is stored to be "5.6", and an evaluation point with respect to a "third use scene (advice)" is stored to be "2.0". In addition, an evaluation point with respect to a "fourth use scene (document preparation)" is "-". This indicates that the "agent A1" does not correspond to the "fourth use scene (the document preparation)". That is, it is indicated that the "agent A1" does not have a document preparation function. Furthermore, for example, in the AI evaluation point table, an evaluation point may be set in advance for each use scene, and the evaluation value set in advance may be evaluated again by the AI evaluation processing unit 54.

In a case where the use scene specified by the user information acquisition unit 51, for example, is the "first use scene (the search during working time)", the AI selection unit 53 selects an "agent B1". In addition, in a case where the use scene specified by the user information acquisition unit 51, for example, is the "second use scene (the private search)", the AI selection unit 53 selects the "agent A1". Thus, even in the case of artificial intelligences having the same search function, an artificial intelligence highly evaluated by the user, is different according to the use scene, but according to this embodiment, it is possible to select a suitable artificial intelligence. Furthermore, in a case where the use scene specified by the user information acquisition unit 51, for example, is the "fourth use scene (the document preparation)", the AI selection unit 53 selects an "agent D1" solely having the document preparation function in this example.

The sound recognition processing unit 55, the communication processing unit 56, and the output control unit 57 cooperate with each other, and thus, communication between the artificial intelligence selected by the AI selection unit 53 and the user, is realized. Furthermore, the artificial intelligence selected by the AI selection unit 53, for example, performs communication with respect to the user as the artificial intelligence agent.

Specifically, the sound recognition processing unit 55 recognizes a sound for the user to perform communication with respect to the artificial intelligence, and converts the sound into text data. In addition, the sound recognition processing unit 55 outputs the converted text data to the communication processing unit 56.

The communication processing unit 56 performs processing relevant to the communication between the user and the artificial intelligence (the artificial intelligence identified by the AI selection unit 53) which is a communication partner. For example, the communication processing unit 56 outputs the text data which is converted by the sound recognition processing unit 55, to the artificial intelligence which is the communication partner. In addition, the communication processing unit 56 outputs information input from the artificial intelligence which is the communication partner, to the output control unit 57, according to the flow of dialogue. Furthermore, the artificial intelligence which is the communication partner, may be realized by the information processing apparatus 1, or may be realized by a device such as a server capable of performing communication through the communication unit 21.

The output control unit 57 outputs information suggested by the communication processing unit 56 (the contents of the communication between the user and the artificial intelligence) from the output unit 19 in a predetermined format. The output, for example, is realized by sound output or text output. In addition, in this embodiment, an image of a character corresponding to the artificial intelligence which is the communication partner, may be displayed.

For example, the image of the character in which the artificial intelligence (for example, the artificial intelligence agent) which is the communication partner, is personalized or pseudobiolated, is displayed, and a lip synchronization operation in which the character performs sound conversation, expression, gesture, or the like is displayed by an animation method or the like of computer graphic synthesis, according to the conversation or the answer of the artificial intelligence. The character may have personality for each of the artificial intelligences. For example, the character may have personality in the name, the gender, the face, the appearance, the body shape, the dress, the type of organism, the voice color, the way to speak, the style, the wording, the habit of gesture, and the like. Accordingly, the user recognizes which artificial intelligence is the artificial intelligence as a communication target, and then, is capable of communicating with the artificial intelligence. In addition, the user is capable of easily recognizing the characteristics or the character of the artificial intelligence agent, and of having affinity.

According to the information processing apparatus 1 described above, a suitable artificial intelligence according to the use scene, can be selected on the basis of the acquired user information or artificial intelligence information.

[Operation]

Figure 4:
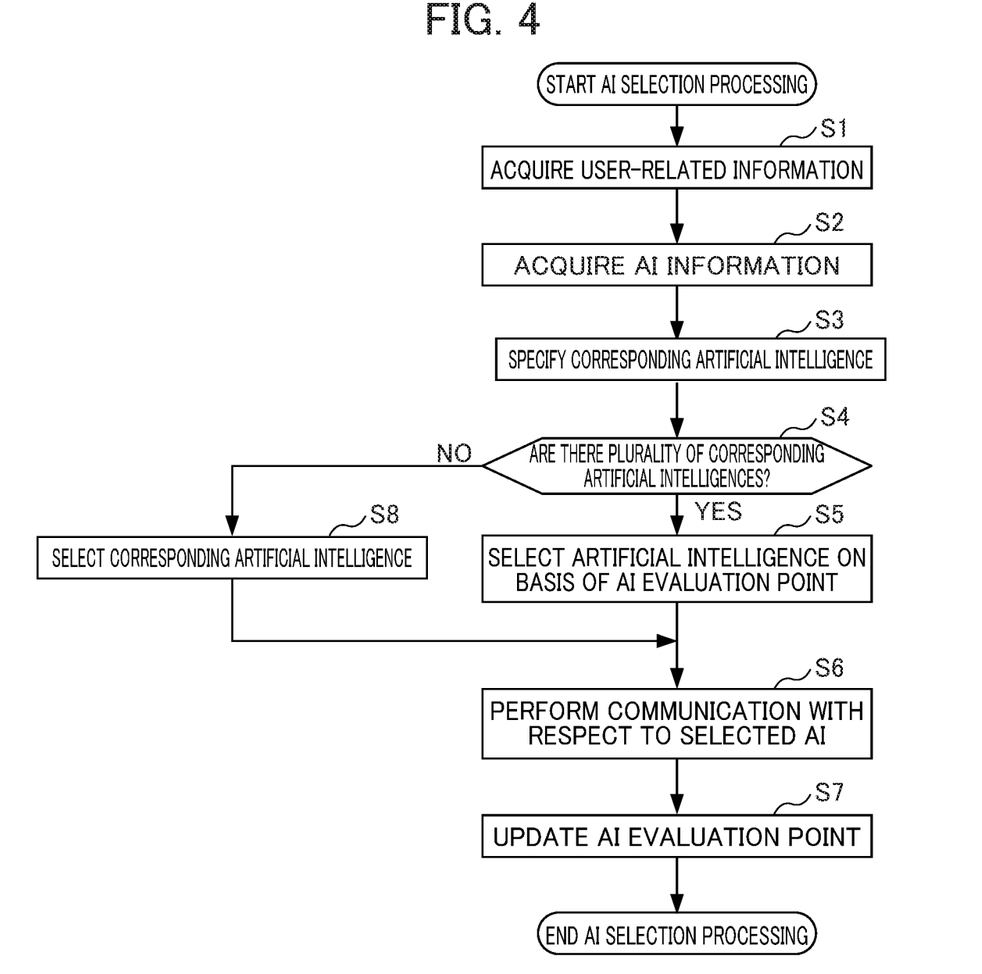
FIG. 4 is a flowchart illustrating a flow of the AI selection processing which is executed by the information processing apparatus of FIG. 1, having the functional configuration of FIG. 2.

Next, the operation of the information processing apparatus 1 will be described. FIG. 4 is a flowchart illustrating the flow of the AI selection processing which is executed by the information processing apparatus 1 of FIG. 1, having the functional configuration of FIG. 2. The AI selection processing is executed in a case where communication is performed with respect to the artificial intelligence in the information processing apparatus 1.

In step S1, the user information acquisition unit 51 acquires the user information. As described above, the user information includes the information relevant to the use scene, as the user-related information. The user information acquisition unit 51 specifies the use scene, on the basis of the acquired user information. In step S2, the AI information acquisition unit 52 acquires the information relevant to the characteristics of the artificial intelligence with respect to each of the plurality of artificial intelligences, as the artificial intelligence information. In step S3, the AI selection unit 53 specifies the artificial intelligence corresponding to the use scene, on the basis of the use scene specified in step S1, and the information relevant to the characteristics of the artificial intelligence with respect to each of the plurality of artificial intelligences, acquired in step S2.

In step S4, the AI selection unit 53 determines whether or not there are a plurality of artificial intelligences corresponding to the use scene, specified in step S3. In a case where there are a plurality of corresponding artificial intelligences, it is determined as Yes in step S4, and the processing proceeds to step S5. On the other hand, in a case where there is only one corresponding artificial intelligence but not the plurality of corresponding artificial intelligences, it is determined as No in step S4, and the processing proceeds to step S8.

In step S5, the AI selection unit 53 refers to the AI evaluation point table stored in the AI evaluation point storage unit 71, in order to further perform search refinement from the plurality of artificial intelligences. Here, as described above, there are a plurality of AI evaluation point tables corresponding to each of the users. Then, the AI selection unit 53 identifies the user, on the basis of the user identification information included in the user-related information acquired in step S1. Next, the AI selection unit 53 specifies the AI evaluation point table corresponding to the identified user. Then, the AI selection unit 53 selects the artificial intelligence, on the basis of the evaluation point stored in the specified AI evaluation point table.

In step S6, the sound recognition processing unit 55, the communication processing unit 56, and the output control unit 57 cooperate with each other, and thus, the communication between the artificial intelligence selected by the AI selection unit 53 and the user is realized.

In step S7, the AI evaluation processing unit 54 calculates the evaluation point with respect to the communication in step S6. Then, the AI evaluation point table stored in the AI evaluation point storage unit 71 is rewritten on the basis of the calculated evaluation point, and thus, the AI evaluation point table is updated. In a case where step S7 is performed, this AI selection processing is ended.

In step S8, the AI selection unit 53 selects one artificial intelligence which is specified in step S3. Subsequently, the processing of step S6 and step S7, is identical to a case where it is determined as Yes in step S4.

According to such processing, it is possible to select one artificial intelligence on the basis of the user-related information. As described above, conventionally, a predetermined artificial intelligence is specified on the basis of the field of the question contents from the user, and thus, it is not possible to select the artificial intelligence until the user asks a question. That is, in a general technology, for example, it is not possible to select an optimal artificial intelligence with respect to the use scene at that time. In contrast, according to the information processing apparatus 1 of this embodiment, it is possible to select a suitable artificial intelligence according to the use scene, even before a question or the like is received from the user.

The information processing apparatus 1 configured as described above, includes the user information acquisition unit 51 and the AI selection unit 53. The user information acquisition unit 51 acquires the information relevant to the use scene, as the user-related information. The AI selection unit 53 selects one artificial intelligence from the plurality of artificial intelligences, on the basis of the user-related information. Accordingly, it is possible to select one artificial intelligence, on the basis of the acquired user-related information. Therefore, it is possible to select a suitable artificial intelligence according to the use scene, even before a question or the like is received from the user. For this reason, it is possible for the user to obtain usability as if using a universal artificial intelligence.

The information processing apparatus 1 further includes the AI information acquisition unit 52 acquiring information relevant to the plurality of artificial intelligences, and the AI selection unit 53 selects one artificial intelligence from the plurality of artificial intelligences, on the basis of the user-related information, and the information relevant to the plurality of artificial intelligences. Accordingly, it is possible to select one artificial intelligence, on the basis of the characteristics of each of the artificial intelligence, which are specified by the information relevant to the plurality of artificial intelligences, and the correspondence with respect to the use scene.

The user-related information includes at least one information of the fitness information, the behavior information, and the biological information, with respect to the user. Accordingly, it is possible to specify the use scene, on the basis of the actual situation or state of the user.

The information processing apparatus 1 further includes the AI evaluation processing unit 54 applying the evaluation point to the processing of each of the plurality of artificial intelligences, and the evaluation point storage unit 71 storing the evaluation point information in which the user-related information at the time of performing processing using the evaluation point as a target to be applied, is associated with the evaluation point, with respect to each of the plurality of artificial intelligences, and the AI selection unit 53 performs the selection, on the basis of the evaluation point stored in the evaluation point storage unit 71, which is associated with the user-related information, at the time of selecting one artificial intelligence, on the basis of the user-related information. Accordingly, in a case where there are a plurality of artificial intelligences according to the use scene, it is possible to further select the artificial intelligence performing the search refinement based on the evaluation point.

The processing of each of the plurality of artificial intelligences, is a response of each of the plurality of artificial intelligences with respect to a predetermined question from the user, and the AI evaluation processing unit 54 applies the evaluation point, on the basis of the evaluation of the user receiving the response. Accordingly, it is possible to select an optimal artificial intelligence for each of the users according to the evaluation point based on the sense or the sensibility of each of the users, without selecting the artificial intelligence by each of the users according to a unified standard.

One artificial intelligence selected by the AI selection unit 53, is the artificial intelligence communicating with the user, as the artificial intelligence agent which is capable of identifying which artificial intelligence it is. Accordingly, the user recognizes which artificial intelligence is the artificial intelligence as the communication target, and then, is capable of communicating with the artificial intelligence.

The artificial intelligence agent communicates with the user while changing an image indicating the artificial intelligence agent according to a lapse of time. Accordingly, the image indicating the artificial intelligence agent (for example, the image of the character in which the artificial intelligence agent is personalized or pseudobiolated) is animated, and thus, it is possible to perform the communication with respect to the user. For this reason, the user is capable of easily recognizing the characteristics or the character of the artificial intelligence agent, and of having affinity.

It should be noted that the present invention is not to be limited to the aforementioned embodiments, and that modifications, improvements, etc. within a scope that can achieve the objects of the present invention are also included in the present invention.

That is, the present invention can be widely applied to an information processing apparatus in which when the user uses the artificial intelligence, the artificial intelligence (for example, the artificial intelligence agent) to be used by the user is selected, and the selection result is output in a format that the user is capable of recognizing. In addition, in the embodiment described above, the concept of the artificial intelligence includes various artificial intelligence technologies such as an artificial intelligence tool, an artificial intelligence program, and an artificial intelligence application.

In addition, in the embodiment described above, the information processing apparatus 1 to which the present invention is applied, has been described as a smart phone, but is not particularly limited thereto. For example, the present invention can be generally applied to an electronic device having an information processing function. Specifically, for example, the present invention can be applied to a notebook personal computer, a printer, a television receiver, a digital camera, a video camera, a portable navigation device, a mobile phone, a portable game machine, or the like.

The processing sequence described above can be executed by hardware, and can also be executed by software. In other words, the hardware configuration of FIG. 2 is merely illustrative examples, and the present invention is not particularly limited thereto. More specifically, the types of functional blocks employed to realize the above-described functions are not particularly limited to the examples shown in FIG. 2. So long as the information processing apparatus 1 can be provided with the functions enabling the aforementioned processing sequence to be executed in its entirety.

A single functional block may be constituted by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is recorded, and a hard disk included in the storage unit 20 of FIG. 1, and the like.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An information processing apparatus comprising:
a processor configured to:
at a first time,
acquire first user-related information;
select a scene corresponding to the first user-related information from a plurality of scenes;
specify a plurality of artificial intelligences corresponding to the scene selected;
access a memory that stores evaluation point information in which, for the scene, an evaluation point is associated with each of the plurality of artificial intelligences;
select a first artificial intelligence from the plurality of artificial intelligences specified, on the basis of the evaluation points associated with the plurality of artificial intelligences;
provide a first response with respect to a question from a user according to the first artificial intelligence selected from the plurality of artificial intelligences; and
update the evaluation point associated with the first artificial intelligence selected on the basis of an evaluation of the user receiving the first response; and
at a second time,
acquire second user-related information;

select the scene as also corresponding to the second user-related information from the plurality of scenes;
specify the plurality of artificial intelligences corresponding to the scene selected;
select a second artificial intelligence, different from the first artificial intelligence, from the plurality of artificial intelligences specified, on the basis of the evaluation points, including the updated evaluation point, associated with the plurality of artificial intelligences; and
provide a second response, different from the first response, with respect to the question from the user according to the second artificial intelligence selected from the plurality of artificial intelligences.

2. The information processing apparatus according to claim 1,
wherein the processor is configured to:
acquire information relevant to characteristics of the plurality of artificial intelligences; and
specify the plurality of artificial intelligences having the characteristics corresponding to the scene selected.

3. The information processing apparatus according to claim 2,
wherein the first user-related information and/or the second user-related information comprises at least one information of fitness information, behavior information, and biological information, with respect to a user.

4. The information processing apparatus according to claim 1,
wherein the first user-related information and/or the second user-related information comprises at least one information of fitness information, behavior information, and biological information, with respect to the user.

5. The information processing apparatus according to claim 1,
wherein the first artificial intelligence and/or the second artificial intelligence to be selected is an artificial intelligence communicating with the user as an artificial intelligence agent which is capable of identifying which artificial intelligence it is.

6. The information processing apparatus according to claim 5,
wherein the artificial intelligence agent communicates with the user while changing an image indicating the artificial intelligence agent according to a lapse of time.

7. An artificial intelligence selecting method comprising:
at a first time,
acquiring first user-related information;
selecting a scene corresponding to the first user-related information from a plurality of scenes;
specifying a plurality of artificial intelligences corresponding to the scene selected;
accessing a memory that stores evaluation point information in which, for the scene, an evaluation point is associated with each of the plurality of artificial intelligences;
selecting a first artificial intelligence from the plurality of artificial intelligences specified, on the basis of the evaluation points associated with the plurality of artificial intelligences;
providing a first response with respect to a question from a user according to the first artificial intelligence selected from the plurality of artificial intelligences; and
updating the evaluation point associated with the first artificial intelligence selected on the basis of an evaluation of the user receiving the first response; and
at a second time,
acquiring second user-related information;
selecting the scene as also corresponding to the second user-related information from the plurality of scenes;
specifying the plurality of artificial intelligences corresponding to the scene selected;
selecting a second artificial intelligence, different from the first artificial intelligence, from the plurality of artificial intelligences specified, on the basis of the evaluation points, including the updated evaluation point, associated with the plurality of artificial intelligences; and
providing a second response, different from the first response, with respect to the question from the user according to the second artificial intelligence selected from the plurality of artificial intelligences.

8. The artificial intelligence selecting method according to claim 7, comprising:
acquiring information relevant to characteristics of the plurality of artificial intelligences; and
specifying the plurality of artificial intelligences having the characteristics corresponding to the scene selected.

9. The artificial intelligence selecting method according to claim 8,
wherein the first user-related information and/or the second user-related information comprises at least one information of fitness information, behavior information, and biological information, with respect to the user.

10. The artificial intelligence selecting method according to claim 7,
wherein the first user-related information and/or the second user-related information comprises at least one information of fitness information, behavior information, and biological information, with respect to the user.

11. The artificial intelligence selecting method according to claim 7,
wherein the first artificial intelligence and/or the second artificial intelligence to be selected is an artificial intelligence communicating with the user as an artificial intelligence agent which is capable of identifying which artificial intelligence it is.

12. The artificial intelligence selecting method according to claim 11,
wherein the artificial intelligence agent communicates with the user while changing an image indicating the artificial intelligence agent according to a lapse of time.

13. A non-transitory computer-readable storage medium storing a program that is executable to cause a computer to at least perform:
at a first time,
acquiring first user-related information;
selecting a scene corresponding to the first user-related information from a plurality of scenes;
specifying a plurality of artificial intelligences corresponding to the scene selected;

accessing a memory that stores evaluation point information in which, for the scene, an evaluation point is associated with each of the plurality of artificial intelligences;

selecting a first artificial intelligence from the plurality of artificial intelligences specified, on the basis of the evaluation points associated with the plurality of artificial intelligences;

providing a first response with respect to a question from a user according to the first artificial intelligence selected from the plurality of artificial intelligences; and updating the evaluation point associated with the first artificial intelligence selected on the basis of an evaluation of the user receiving the first response; and at a second time, acquiring second user-related information;

selecting the scene as also corresponding to the second user-related information from the plurality of scenes;

specifying the plurality of artificial intelligences corresponding to the scene selected;

selecting a second artificial intelligence, different from the first artificial intelligence, from the plurality of artificial intelligences specified, on the basis of the evaluation points, including the updated evaluation point, associated with the plurality of artificial intelligences; and providing a second response, different from the first response, with respect to the question from the user according to the second artificial intelligence selected from the plurality of artificial intelligences.

14. The non-transitory computer-readable storage medium according to claim 13, wherein the program is executable to cause the computer to perform:

acquiring information relevant to characteristics of the plurality of artificial intelligences; and specifying the plurality of artificial intelligences having the characteristics corresponding to the scene selected.

15. The non-transitory computer-readable storage medium according to claim 14, wherein the first user-related information and/or the second user-related information comprises at least one information of fitness information, behavior information, and biological information, with respect to a user.

16. The non-transitory computer-readable storage medium according to claim 13, wherein the first user-related information and/or the second user-related information comprises at least one information of fitness information, behavior information, and biological information, with respect to a user.

17. The non-transitory computer-readable storage medium according to claim 13, wherein the first artificial intelligence and/or the second artificial intelligence to be selected is an artificial intelligence communicating with the user as an artificial intelligence agent which is capable of identifying which artificial intelligence it is.

18. The non-transitory computer-readable storage medium according to claim 17, wherein the artificial intelligence agent communicates with the user while changing an image indicating the artificial intelligence agent according to a lapse of time.

* * * * *